US011482351B2

(12) United States Patent
Horvath

(10) Patent No.: US 11,482,351 B2
(45) Date of Patent: Oct. 25, 2022

(54) PLUGGABLE NETWORK INTERFACE PORT WITH POWERING FOR REMOTE DEVICE

(71) Applicant: HEWLETT PACKARD ENTERPRISE DEVELOPMENT LP, Houston, TX (US)

(72) Inventor: Stephen E. Horvath, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 100 days.

(21) Appl. No.: 17/037,436

(22) Filed: Sep. 29, 2020

(65) Prior Publication Data

US 2022/0102028 A1    Mar. 31, 2022

(51) Int. Cl.
| | |
|---|---|
| *H01B 9/00* | (2006.01) |
| *H01R 13/66* | (2006.01) |
| *G06F 1/28* | (2006.01) |
| *H02H 9/02* | (2006.01) |
| *H02M 3/04* | (2006.01) |

(52) U.S. Cl.
CPC .............. *H01B 9/005* (2013.01); *G06F 1/28* (2013.01); *H01R 13/6675* (2013.01); *H02H 9/02* (2013.01); *H02M 3/04* (2013.01)

(58) Field of Classification Search
CPC ....... H01B 9/005; G06F 1/28; H01R 13/6675; H02H 9/02; H02M 3/04
See application file for complete search history.

(56) References Cited

U.S. PATENT DOCUMENTS

| | | | |
|---|---|---|---|
| 8,184,933 B1 * | 5/2012 | Aybay | .................. G02B 6/3895 |
| | | | 385/100 |
| 10,014,958 B2 | 7/2018 | Sipes, Jr. et al. | |

(Continued)

FOREIGN PATENT DOCUMENTS

| | | |
|---|---|---|
| CN | 104412541 A | 3/2015 |
| WO | WO-2015005835 A1 | 1/2015 |

OTHER PUBLICATIONS

Schurter Electronic Components, "Overcurrent Protection for Power Over Ethernet (PoE)," retrieved online Sep. 18, 2020, https://docs.rs.online.com/16b5/0900766b812d1e18.pdf.

*Primary Examiner* — Carlos Amaya
(74) *Attorney, Agent, or Firm* — Nolte Intellectual Property Law Group

(57) ABSTRACT

A network apparatus includes a hybrid data/power cable further including a power conductor and a data conductor extending between a first end and a second end thereof, the first end of the hybrid data/power cable terminating with a first connector head. The first connector head includes a fuse element coupled in series with the power conductor of the hybrid data/power cable. A remote device is coupled to the second end of the hybrid data/power cable for receiving a data signal from the data conductor of the hybrid data/power cable and a DC voltage from the power conductor of the first hybrid data/power cable. The remote device includes a current-limiting circuit coupled in series with the power conductor of the first hybrid data/power cable to produce a DC voltage at an output of the current-limiting circuit. The remote device further includes a buck/boost converter coupled to the output of the current-limiting circuit for adjusting the DC voltage. An external power supply may also be provided for the remote device.

19 Claims, 9 Drawing Sheets

(56) References Cited

U.S. PATENT DOCUMENTS

| | | |
|---|---|---|
| 10,672,537 B2 | 6/2020 | Goergen et al. |
| 10,735,105 B2 | 8/2020 | Goergen et al. |
| 2022/0034975 A1* | 2/2022 | Strickling .............. H01R 13/64 |

* cited by examiner

PLUGGABLE NETWORK INTERFACE PORT WITH POWERING FOR REMOTE DEVICE

BACKGROUND

Computing systems may include a number of compute modules and other components (memory units, data routers, and the like) which may be interconnected with fiberoptic cables carrying high-bandwidth digital signals. Some compute modules and system components, such as rack-mounted compute modules in computing and data centers, may be interconnected with multiple external fiberoptic cables.

BRIEF DESCRIPTION OF THE DRAWINGS

The present disclosure is best understood from the following detailed description when read with the accompanying figures, wherein.

Figure 1A:
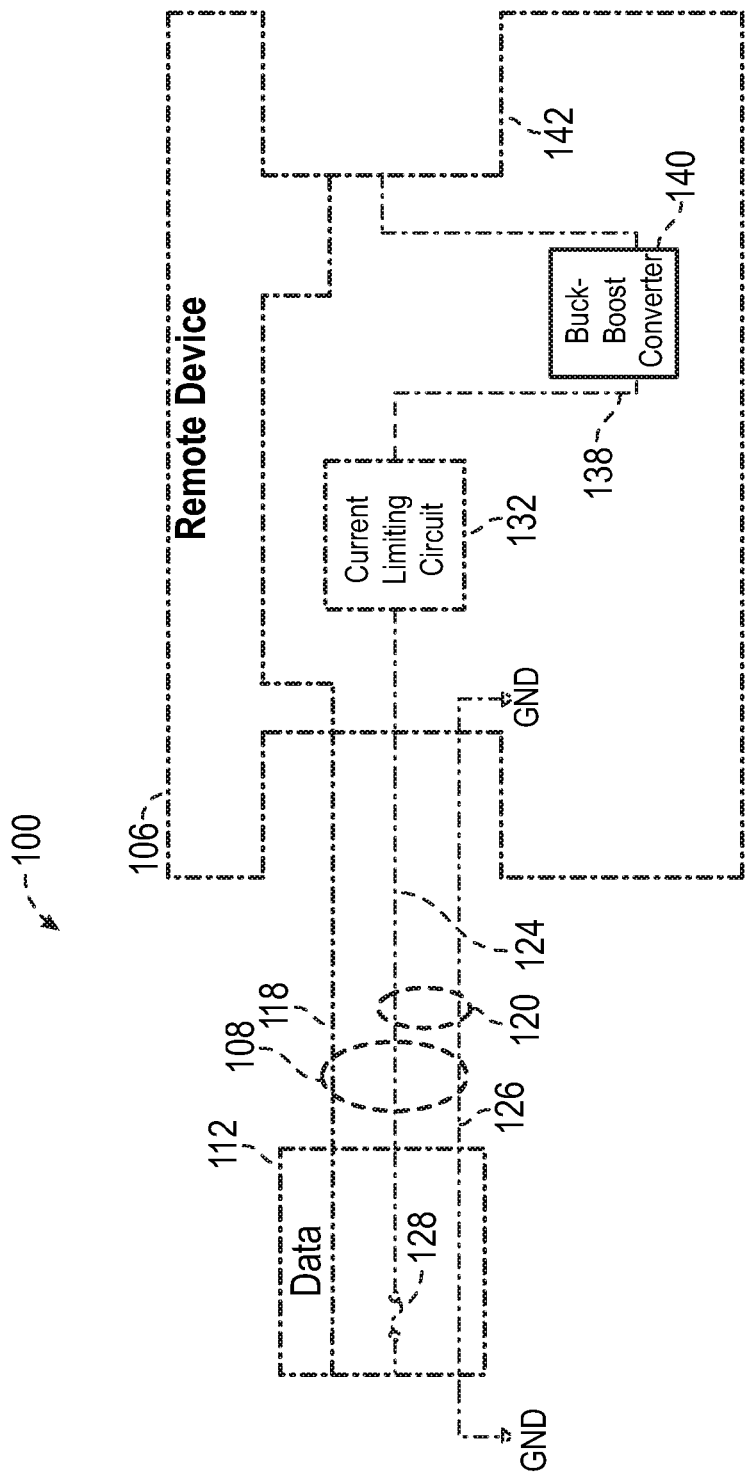
FIG. 1A is a block diagram of a network apparatus including a remote device according to one example.

It is emphasized that, in accordance with the standard practice in the industry, various features are not drawn to scale. In fact, the dimensions of the various features may be arbitrarily increased or reduced for clarity of discussion or illustration.

DETAILED DESCRIPTION

Illustrative examples of the subject matter claimed below are disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

As used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

Further, as used herein, the term "power conductor" is intended to refer to any one or more conductive elements, such as wires, cables, ribbons, electrical traces, and the like, capable of conducting alternating current ("AC") and/or direct current ("DC") voltages from one point to another.

The term "data conductor" is intended to refer to any one or more elements, electrical, optical, or otherwise, capable of communicating data, such as data in the form of binary signals from one point to another. A data conductor may be in the form of a single conductive element or a plurality of conductive elements, such as a twisted pair of conductors or a multi-filament wire or cable, or may be in the form of a single optical signal conductor, such as an optical fiber, or a plurality of optical signal conductors, such as a duplex or multiplex optical cable containing two or more optical fibers.

The term "rectifier element" is intended to refer to an electrical component, such as a diode, rectifier, or circuitry such as complementary metal-oxide semiconductor ("CMOS") circuitry for performing a rectifying function on an electrical signal to permit current to travel in only a single direction along a conductive path including the rectifier element.

A "current limiting element" may comprise any discrete electronic component, such as a resistor, diode, rectifier, or transistor, or any combination thereof, or circuits involving combinations thereof, for performing a current-limiting function on an applied electrical current. In some examples, a current limiting element may be an active circuit including transistors and other circuit elements for allowing current to freely flow without significant resistance up to a predetermined threshold, above which current is limited with increased resistance.

The term "fuse element" is intended to refer to any electrical or electronic element for performing a limiting function whereby any voltage or current over a predetermined threshold is prevented from being conducted. A fuse element may be a metallic element, such as a metallic filament, adapted to be physically altered in response to an applied overvoltage or overcurrent, a positive temperature coefficient ("PTC") device which undergoes an increase in resistance in response to overvoltages or overcurrents causing resistive heating, or active circuits, which may include CMOS circuit elements for limiting overcurrents or overvoltages.

In various examples herein, a remote network device such as a media converter may be connected to the physical interface (e.g., a port) of a compute device such as a network switch. The physical interface may be a small form-factor pluggable ("SFP") socket of a network switch. The remote device may be a media converter for establishing data transfer compatibility between the compute device and one or more modular (e.g., SFP) transceivers, such as long-reach multi-mode ("LRM") transceivers, that are not directly compatible with the compute device. Power from the compute device may be supplied to the remote device to power the remote device circuitry and the modular transceiver(s) coupled to the remote device; however, a voltage drop may occur in the connection between the compute device and the remote device, such that insufficient power is supplied to the remote device and modular transceiver(s).

In examples, one or more hybrid data and power cables ("hybrid data/power cables"), each having at least one power conductor and at least one data conductor, connect the compute device to the remote device. Hybrid data/power cables may include connector heads that are compatible with the physical ports of the compute device. At least one connector head of each hybrid data/power cable, preferably the connector head connected to the compute device, includes a fuse element. In some examples, one or both connector heads of a hybrid data/power cable may include a fuse element for protecting a connected device from electrical faults or shorts, and for preventing more than a predetermined amount of power from being drawn from one device to another through the hybrid data/power cable.

In addition, in various examples, a remote device may include a buck/boost converter for combining and adjusting (stepping up or stepping down) the DC voltage(s) from the one or more connector hybrid data/power cable and an optional additional power source may be provided for a remote device to supplement the power supplied to the voltage converter in the remote device. A rectifier element may be provided in a remote device to protect the compute device from over-voltages on the power conductors of the hybrid data/power cable(s).

Further, in various examples, a hybrid data/power cable connector head may include a contain memory element containing identification information for the hybrid data/power cable. The identification information may be accessible by a network device, such as a switch, to which the hybrid data/power cable is connected.

FIG. 1A is a block diagram of a network apparatus 100 including a remote device 106 having a hybrid data/power cable 108 in accordance with one or more other examples. In some examples, remote device 106 may be a media converter for enabling a network device (not shown in FIG. 1), such as a switch.

Hybrid data/power cable 108 terminates at a first end with a first connector head 112. First connector head 112 may be compatible with a small form-factor pluggable ("SFP") socket. SFP sockets are configured to accept insertion of modular transceivers, such as long-reach multi-mode ("LRM") transceivers for coupling with fiberoptic cables. A modular transceiver compatible with SFP sockets may receive both data and power signals via the SFP socket. SFP sockets are also configured to accept insertion of connector heads of direct attach copper ("DAC") cables. DAC cables are made from twin-axial copper wiring and are terminated at each end with connector heads providing data connection directly with sockets, such as SFP sockets, of networking devices.

Figure 1B:
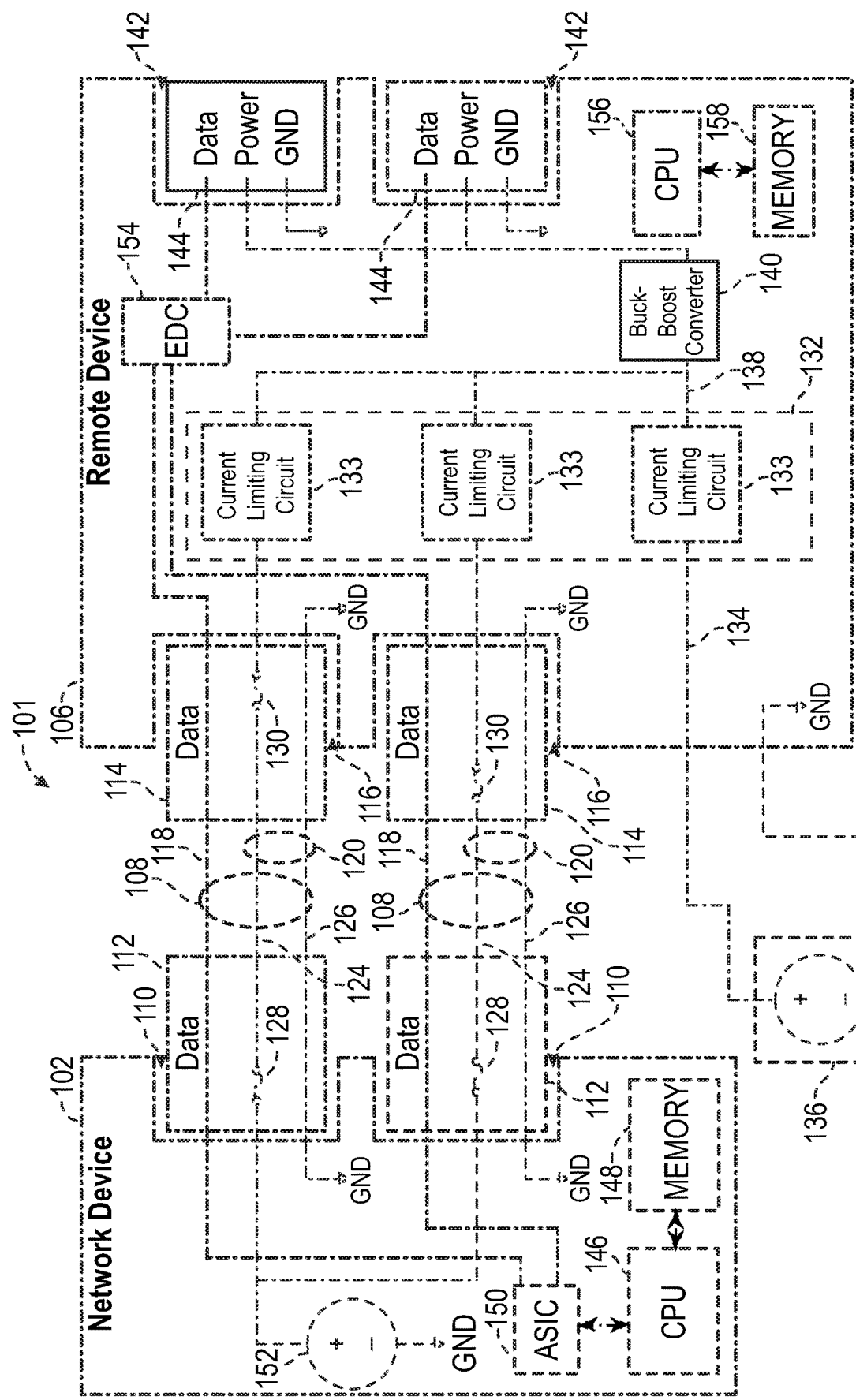
FIG. 1B is a block diagram of a network system including a network device and a remote device according to one example.

As shown in FIG. 1A, each hybrid data/power cable 108 may include at least one data conductor 118 and at least one power conductor 120. In the example of FIG. 1B, a positive power conductor 124 and a ground (GND) power conductor 126 are shown. The at least one data conductor 118 may, in various examples, include one or more twin axial cables.

In first connector head 112 of hybrid data/power cable 108, a fuse element 128 is coupled in series with positive power conductor 124. In various examples, fuse element 128 may be a conventional metal filament fuse. In other examples, fuse element 128 may be a PTC resettable fuse element. In other examples, fuse element 128 may be an active current-limiting circuit for limiting conduction of currents/voltages over a predetermined threshold.

With continued reference to FIG. 1A, positive power conductor 124 of hybrid data/power cable 108 is coupled to a current-limiting circuit 132 in remote device 106. In various examples, current-limiting circuit 132 may comprise a current-limiting circuit in series with positive power conductor 124 to prevent conduction of overvoltages on hybrid data/power cable 108 being conducted back to connector head 112. Current-limiting circuit 132 may also protect hybrid data/power cable 108 and a device coupled thereto from electrical shorts or other faults in remote device 106 which might cause remote device 106 to draw more than an expected amount of power.

In the example of FIG. 1A, an output 138 of current-limiting circuit 132 is coupled to a buck/boost converter 140. Buck/boost converter 140 may operate to adjust (i.e., either step up or step down) the voltage provided from hybrid data/power cable 108 after passing through current-limiting circuit 132 to provide a regulated voltage, such as 3.3V, to a modular socket 142 of remote device 106. In some examples, buck/boost converter may operate to compensate for voltage drops associated with fuse element 128 in connector head 112.

In various examples, modular socket 142 of remote device 106 may comprise and SFP socket for accepting a modular transceiver, such as an LRM transceiver operable to transmit and receive data on fiberoptic cables, which may be duplex fiberoptic cables containing one, two or more optical fibers, such as a transmit optical fiber and a receive optical fiber.

Modular transceivers, such as LRM transceivers, may connect to receive both power and electronic digital data signals from an SFP socket of a network device. Modular transceivers may convert electronic digital data signals into optical signals carried over fiberoptic cables coupled to the modular transceivers, and the power supplied from the SFP socket provides power for the transceivers to make the conversion from electronic signals to optical signals transmitted over the fiberoptic cables. On the other hand, cables such as DAC cables may connect a socket such as an SFP socket to receive only the electronic digital data signals and to conduct those electronic digital data signals over conductive wires.

FIG. 1B is a block diagram of a network system 101 including a network device 102 and a remote device 106 coupled to the network device 102 via a plurality of hybrid data/power cables 108 in accordance with one or more other examples. The elements in network system 101 of FIG. 1B that are substantially identical to those of system 100 of FIG. 1A have retained identical reference numerals. In some examples, network device 102 may be a network switch having a plurality of sockets 110 for connecting network device 102 with other networking components. In some examples, remote device 106 may be a media converter for enabling a network device 102, such as a switch, to communicate with other networking devices which may not be compatible with the sockets 110 of the network device 102.

In various examples, a network device may engage in any network data transmission operations, including, but not limited to, switching, routing, bridging, or a combination thereof. Moreover, a network device may gather network operating information from various nodes of one or more networks, including network traffic load information, network topology information, network usage information, etc. Furthermore, a network device may transmit commands to various nodes of the one or more networks to alter network topology and routing to achieve various network efficiency and efficacy goals. It will be understood by one of ordinary skill in the art that a network device may comprise any necessary hardware components to perform the inventions disclosed herein, including, but not limited to: processors, memories, display devices, input devices, communications equipment, etc.

As noted, in the example of FIG. 1B, network device 102 is coupled to remote device 106 via at least one hybrid data/power cable 108. In the example of FIG. 1B, two hybrid data/power cables 108 are shown. Each hybrid data/power cable 108 terminates at a first end with a first connector head 112 inserted in a socket 110 of network device 102. In various examples, each hybrid data/power cable 108 terminates at a second end with second connector head 114 inserted into a socket 116 of remote device 106.

In some examples, sockets 110 of network device 102 and sockets 116 of remote device 106 may be SFP sockets, which, as noted above, are configured to accept insertion of modular transceivers, such as LRM transceivers for coupling with fiberoptic cables.

In some examples, such as shown in the example of FIG. 1A, hybrid data/power cables 108 may be hard-wired into remote device 106, thereby eliminating the need for sockets 116 and second connector heads 114 at one end of each hybrid data/power cable 108.

As shown in FIG. 1B, each hybrid data/power cable 108 may include at least one data conductor 118 and at least one power conductor 120. In the example of FIG. 1B, a positive power conductor 124 and a ground (GND) power conductor 126 are shown. The at least one data conductor 118 may, in various examples, include one or more twin axial cables.

In first connector head 112 of each hybrid data/power cable 108, a fuse element 128 is coupled in series with positive power conductor 124. In various examples, fuse elements 128 may be a conventional metal filament fuse. In other examples, fuse elements 128 may be PTC resettable fuse elements. In other examples, fuse elements 128 may be active current-limiting circuitry for limiting conduction of currents/voltages over a predetermined threshold. Similar fuse elements 130 may be disposed in series with positive power conductors 124 of hybrid data/power cables 108 in second connector heads 114 of hybrid data/power cables 108 coupled to remote device 106.

With continued reference to FIG. 1B, positive power conductors 124 of hybrid data/power cables 108 are each coupled to a current-limiting circuit 132 in remote device 106. In various examples, current-limiting circuit 132 combines power supplied on the positive power conductors 124 of hybrid data/power cables 108 and may comprise a current-limiting circuit 133 in series with each positive power conductor 124 to prevent conduction of overvoltages on hybrid data/power cables 108 being conducted back to network device 102. In other examples, current-limiting circuit 132 may comprise active circuitry for balancing current transmitted over hybrid data/power cables 108 in order to prevent excessive currents and/or voltages from triggering fuse elements 128 in the first connector head 112 and second connector head 114 of each hybrid data/power cable 108.

An additional input 134 to current-limiting circuit 132 may be provided from an external power supply 136 to remote device 106. In various examples, external power supply 136 may be a universal serial bus (USB) input providing power over a USB connector. External power on additional input 134 is applied to current-limiting circuit 132 and in the example of FIG. 1B is coupled in series with a current-limiting circuit 133. The outputs of respective current-limiting circuits 133 are combined at an output 138, which thus reflects the combined voltages which may be received from hybrid data/power cables 108 and/or additional input 134.

In the example of FIG. 1B, output 138 of current-limiting circuit 132 is coupled to a buck/boost converter 140. Buck/boost converter 140 may operate to adjust (i.e., either step up or step down) the combined voltages provided from hybrid data/power cables 108 and external power supply 136 after passing through current-limiting circuit 132 to provide a regulated voltage, such as 3.3V, to one or more modular sockets 142 of remote device 106.

In various examples, modular sockets 142 of remote device 106 may comprise SFP sockets for accepting modular transceivers, such as transceivers 144 as shown in FIG. 1B. In some examples, transceivers 144 may be LRM transceivers operable to transmit and receive data on fiberoptic cables, which may be duplex fiberoptic cables containing one, two or more optical fibers, such as a transmit optical fiber and a receive optical fiber.

With continued reference to FIG. 1B, operation of network device 102 may be controlled by a central processing unit ("CPU") 146, operating according program instructions stored in an attached memory 148. Furthermore, data conductor 118 coupled at first connector heads 112 to network device 102 may be coupled to processing circuitry, such as an application-specific integrated circuit ("ASIC") 150. ASIC 150 may also be coupled to CPU 146. As shown in FIG. 1B, network device 102 may include a power supply 152 for providing power to network device 102 as well as to power conductors 120 of hybrid data/power cables 108 attached to network device.

In examples, within remote device 106, data received from transceivers 144 may be processed through an electronic dispersion compensation ("EDC") circuit 154 before being applied to hybrid data/power cables 108. EDC processing by EDC circuit 154 may compensate for data distortion occurring due to optical dispersion in fiberoptic cables attached to transceivers 144.

As shown in FIG. 1B, remote device 106 may include a CPU 156 for controlling operations of remote device 106. CPU 156 may be coupled to a memory 158 containing program instructions for CPU 156.

Figure 2A:
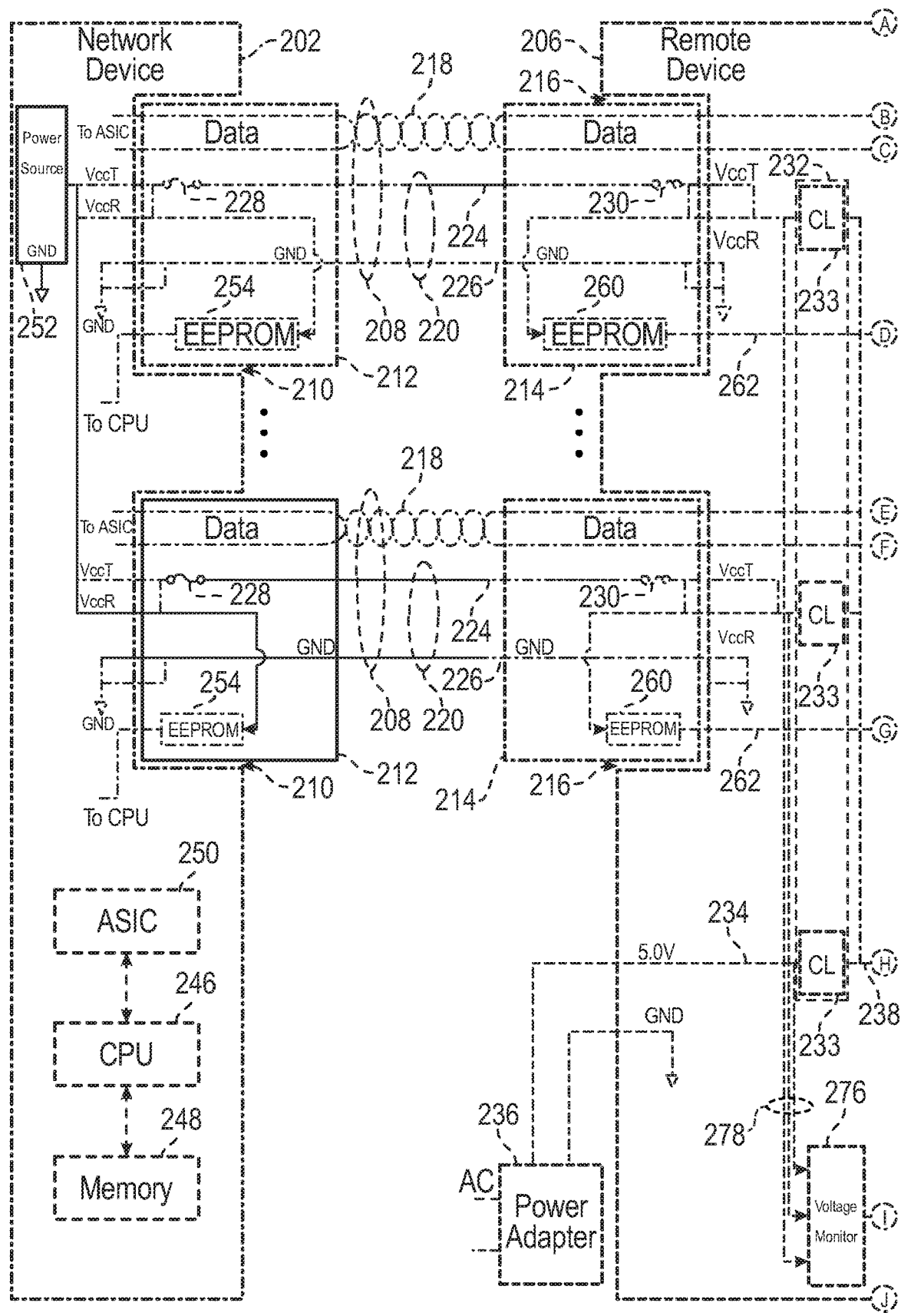
FIGS. 2A and 2B are a block diagram of a network system including a network device and a remote network device assembly according to another example.
Figure 2B:
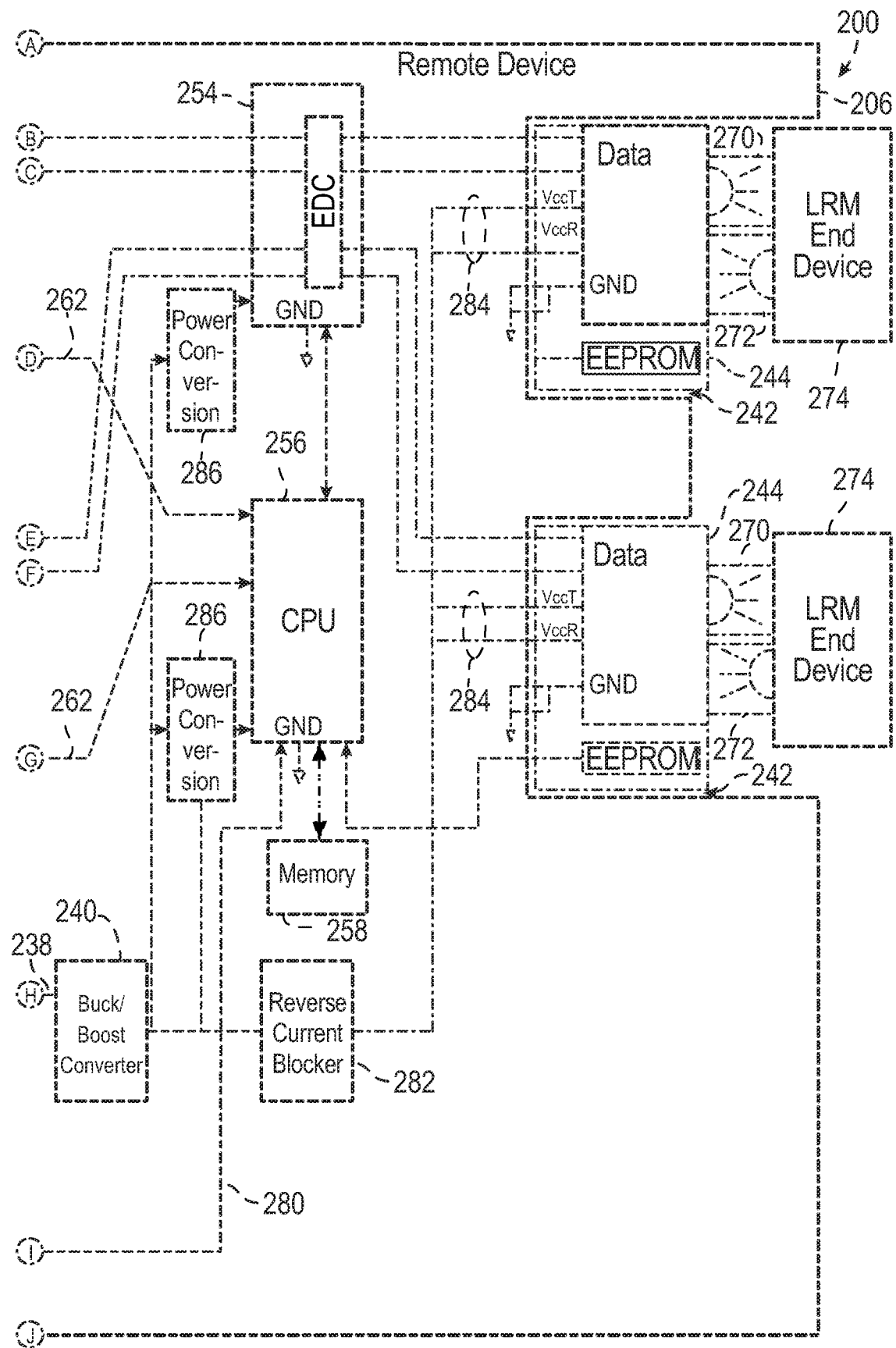

FIGS. 2A and 2B together are a block diagram of a network system 200 according to one or more other examples. Network system 200 includes a network device 202 and a remote device 206 coupled to the network device 202 via a plurality of hybrid data/power cables 208. In some examples, network device 202 may be a network switch having a plurality of sockets 210 for connecting network device 202 with other networking components. In some examples, remote device 206 may be a media converter for enabling a network device 202 such as a switch to communicate with other networking devices which may not be compatible with the sockets 210 of the network device 202.

As noted above, in the example of FIGS. 2A and 2B, network device 202 is coupled to remote device 206 via at least one hybrid data/power cable 208. In the example of FIGS. 2A and 2B, two hybrid data/power cables 208 are shown. Each hybrid data/power cable 208 terminates at a first end with a first connector head 212 inserted in a socket 210 of network device 202. In various examples, each hybrid data/power cable 208 terminates at a second end with a second connector head 214 inserted into a socket 216 of remote device 206.

In some examples, sockets 210 of network device 202 and sockets 216 of remote device 206 may be small form-factor pluggable ("SFP") sockets, as described above with reference to FIG. 1. Also as previously noted, modular transceivers compatible with SFP sockets may receive both data and power signals via the SFP socket. SFP sockets are also configured to accept insertion of connector heads of DAC cables.

In some examples, although not shown in the example of FIGS. 2A and 2B, hybrid data/power cables 208 may be hard-wired into remote device 206, thereby eliminating the need for sockets 216 and second connector heads 214 at one end of each hybrid data/power cable 208.

As shown in FIGS. 2A and 2B, each hybrid data/power cable 208 may include at least one data conductor 218 and at least one power conductor 220. In the example of FIGS. 2A and 2B, a positive power conductor 224 and a ground (GND) power conductor 226 are shown. The at least one data conductor 218 may, in various examples, include one or more twin axial cables 222.

In first connector head 212 of each hybrid data/power cable 208, a fuse element 228 is coupled in series with positive power conductor 224. In various examples, fuse elements 228 may be a conventional metal filament fuse. In other examples, fuse elements 228 may be PTC resettable fuse elements. In other examples, fuse elements 228 may be active current-limiting circuitry for limiting conduction of currents/voltages over a predetermined threshold. Similar fuse elements 230 may be disposed in series with positive power conductors 224 of hybrid data/power cables 208 in second connector heads 214 of hybrid data/power cables 208 coupled to remote device 206, in addition to fuse elements 228 in first connector heads 212 of each hybrid data/power cable. Fuse elements 228 and 230 may protect network device 202 from overvoltages or overcurrents occurring on power conductors 220 of hybrid data/power cables 208.

With continued reference to FIGS. 2A and 2B, positive power conductors 224 of hybrid data/power cables 208 are each coupled to a current-limiting circuit 232 in remote device 206. In various examples, current-limiting circuit 232 combines the power signals on the positive power conductors 224 of hybrid data/power cables 208 and may comprise a current-limiting element 233 (designated "CL" in FIGS. 2A and 2B) in series with each positive power conductor 224 to prevent conduction of overvoltages on hybrid data/power cables 208 being conducted back to network device 202. In other examples, current-limiting circuit 232 may comprise active circuitry for balancing current transmitted over hybrid data/power cables 208 in order to prevent excessive currents and/or voltages from triggering fuse elements 228 in the first connector head 212 and second connector head 214 of each hybrid data/power cable 208, or to balance currents from hybrid data/power cables 208.

An additional input 234 to current-limiting circuit 232 may be provided from an external power supply 236 to remote device 206. In various examples, external power supply 236 may be a universal serial bus (USB) input providing power over a USB connector. External power on additional input 234 is applied to current-limiting circuit 232 and in the example of FIGS. 2A and 2B is coupled in series with a current-limiting element 233.

In the example of FIGS. 2A and 2B, an output 238 of current-limiting circuit 232 is coupled to a buck/boost converter 240. Buck/boost converter 240 may operate to adjust (i.e., either step up or step down) the combined voltages provided from hybrid data/power cables 208 and external power supply 236 after passing through current-limiting circuit 232 to provide a regulated voltage, such as 3.3V, to one or more modular sockets 242 of remote device 206.

In various examples, modular sockets 242 of remote device 206 may comprise SFP sockets for accepting modular transceivers, such as transceivers 244 as shown in FIGS. 2A and 2B. Transceivers 244 may be LRM transceivers operable to transmit and receive data on optical cables such as fiberoptic cables 270 and 272 shown in FIGS. 2A and 2B, which may be duplex optical cables containing one, two or more optical fibers, such as a transmit optical fiber and a receive optical fiber. Fiberoptic cables 270 and 272 may couple transceivers 244 with LRM end devices 274.

With continued reference to FIGS. 2A and 2B, operation of network device 202 may be controlled by a CPU 246, operating according to program instructions stored in an attached memory 248. Furthermore, data conductors 218 coupled at first connector heads 212 to network device 202 may be coupled to processing circuitry, such as an ASIC 250. ASIC 250 may also be coupled to CPU 246. As shown in FIG. 2A, network device 202 may include a power supply 252 for providing power to network device 202 as well as to power conductors 220 of hybrid data/power cables 208 attached to network device.

As shown in FIGS. 2A and 2B, first connector heads 212 of each hybrid data/power cable 208 may include a memory device, such as an electrically-erasable programmable read-only memory (EEPROM) 254, which may be coupled to CPU 246 of network device 202. In various examples, EEPROMs 254 may store information which identifies characteristics of hybrid data/power cables. EEPROMs 254 may be accessible to CPU 246 in order for CPU 246 to control operation of network device 202 according to the characteristics of the hybrid data/power cables 208 inserted into sockets 210 of network device 202. Thus, for example, CPU 246 may interrogate EEPROMs 254 of first connector heads 212 to determine that cables 208 are hybrid data/power cables to which power from power source 252 is to be supplied. In response to the identification information, CPU 246 may selectively control network device 202 to provide power over power conductors 220 of hybrid data/power cables 208.

With continued reference to FIGS. 2A and 2B, operation of remote device 206 may be controlled by a central processing unit (CPU) 256, operating according program instructions stored in an attached memory 258.

In examples, within remote device 206, data received from transceivers 244 may be processed through an electronic dispersion compensation (EDC) circuit 254 before being applied to hybrid data/power cables 208. EDC processing by EDC circuit 254 may compensate for data distortion occurring due to optical dispersion in fiberoptic cables 270 and 272 attached to transceivers 244.

As shown in FIGS. 2A and 2B, remote device 206 may include a CPU 256 for controlling operations of remote device 206. CPU 256 may be coupled to a memory 258 containing program instructions for CPU 256. In various examples, second connector heads 214 inserted into sockets 216 of remote device 206 may include memory devices, such as EEPROMs 260 shown in FIGS. 2A and 2B containing identification information for hybrid data/power cables 208. In examples, CPU 256 may be coupled to EEPROMs 260 via inter-circuit communication lines 262 to enable CPU 256 to interrogate EEPROMs 260, thereby obtaining identification information for hybrid data/power cables 208 inserted into sockets 216 of remote device 206. In response to the identification information, remote device 206 may selectively receive power from power conductor 220 of hybrid data/power cable 208.

In the example of FIGS. 2A and 2B, a voltage monitor 276 may be coupled with lines 278 to the individual inputs of current-limiting circuit 232. Voltage monitor 276 may communicate with CPU 256 of remote device 206 via a connection, and may include active circuitry for adjusting power cooperating with current-limiting circuit 232 to avoid overvoltages or overcurrents from occurring at the output 238 of current-limiting circuit 232. Voltage monitor 276 may cooperate with CPU 256 via a connection 280 to achieve desired load balancing.

In addition, a reverse current blocker circuit 282 may be provided between buck/boost converter 240 and power inputs 284 to modular sockets 242. Reverse current blocker circuit 282 may comprise a rectifier element such as a diode, for preventing reverse current from sockets 242 from interfering with operation of buck/boost converter 240. Reverse current blocker circuit 282 may further perform a current-limiting function to prevent undesirably high currents from being drawn by an attached transceiver 244. Additionally, power conversion circuits 286 may be provided for EDC circuit 254 and CPU 256 to ensure proper power levels are provided.

Figure 3A:
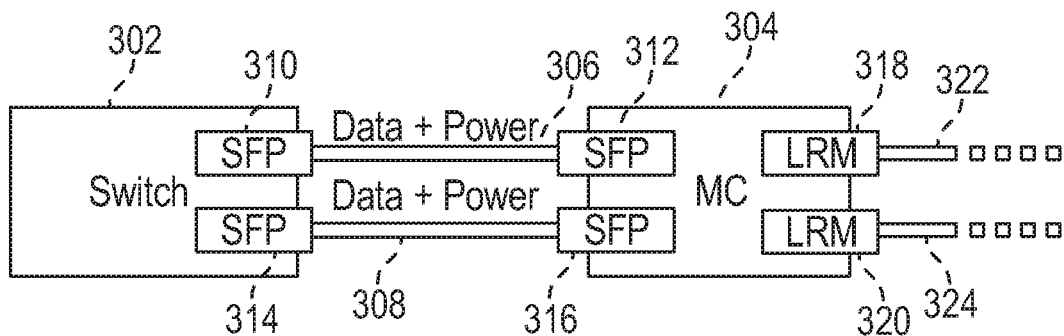
FIGS. 3A-3C are block diagrams illustrating example configurations of network systems in accordance with various examples.
Figure 3B:
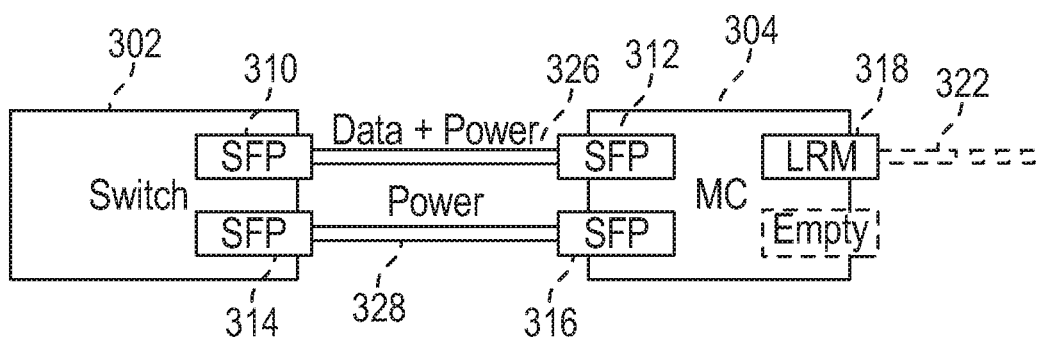
Figure 3C:
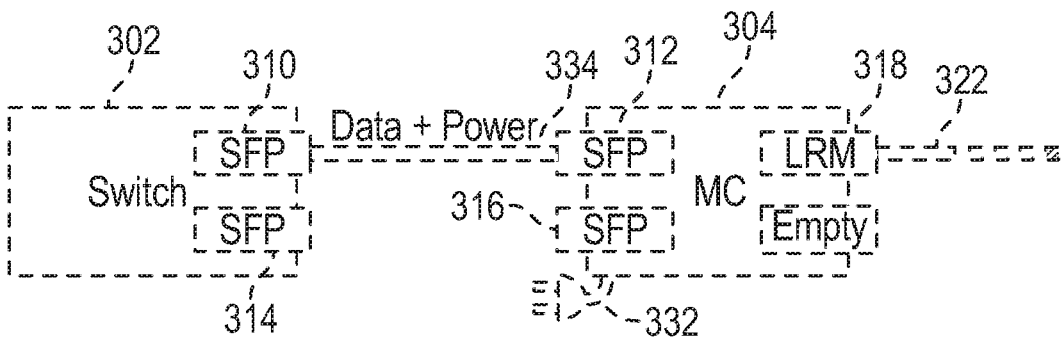

FIGS. 3A-3C show examples of varying configurations of hybrid data/power cables connecting a network device with a remote device according to various examples. As will be described, in each of these examples, a switch is coupled to a media controller by some combination of hybrid data/power cables, power cables, and data cables. It is to be understood that the switch and media converters shown in the examples of FIGS. 3A-3C are intended to be illustrative only, and that network devices other than switches and remote devices other than media converters may be coupled as shown in these examples. Further, although the sockets for connection of cables between the devices in FIGS. 3A-3C are SFP sockets, in other examples these sockets may be of a different type.

In FIG. 3A, a switch 302, is connected to a media converter 304 by two hybrid data/power cables 306 and 308. In this example, hybrid data/power cable 306 is connected at a first end to a first SFP socket 310 of switch 302. Hybrid data/power cable 306 is coupled at a second end to an SPF socket 312 of media converter 304. In addition, hybrid data/power cable 308 is coupled at a first end to a second SFP socket 314 of switch 302 and at a second end to a second SFP socket 316 of media converter 304. A pair of LRM transceivers 318 and 320 are inserted into media converter 304 to provide attachment to a respective pair of fiberoptic cables 322 and 324. With the arrangement shown in FIG. 3A, power for media converter 304 as well as for LRM transceivers 318 and 320 may be provided by both hybrid data/power cables 306 and 308. Data on hybrid data/power cable 306 may be converted by media converter 304 for transmission through LRM transceiver 318 and optical cable 322, while data on hybrid data/power cable 308 may be converted by media converter 304 for transmission through LRM transceiver 320 and optical cable 324.

Turning to FIG. 3B, in this example switch 302 is coupled to media converter 304 by a hybrid data/power cable 326 and a power cable 328. In particular, hybrid data/power cable 326 is coupled at a first end to first SFP socket 310 of switch 302 and at a second end to first SFP socket 312 of media converter 304. Power cable 328 is coupled at a first end to second SFP socket 314 of switch 302 and at a second end to second SFP socket 316 of media converter 304. In this example, a single LRM transceiver 318 is coupled to media converter for connection to first optical cable 322. In this arrangement, power for media converter 304 and for LRM transceiver 318 may be provided by both hybrid data/power cable 326 and power cable 328.

Turning to FIG. 3C, in this example, switch 302 is coupled to media converter 304 by hybrid data/power cable 334. In particular, data cable 334 is coupled at a first end to first SFP socket 310 of switch 302 and at a second end to first SFP socket 312 of media converter 304. In this example, however, power conducted over hybrid data/power cable 334 between SFP sockets 310 and 312 may be insufficient to supply media converter 304 and transceiver 318. No connection is provided between second SFP socket 314 of switch 302 and second SFP socket 316 of media converter 304. LRM transceiver 318 is coupled to media converter 304 for connection to first optical cable 322. In this arrangement, since power provided to media converter 304 via data cable 334 may be insufficient, external power supply 332 is coupled to media converter to provide power for media converter 304 and transceiver 318.

Figure 4A:
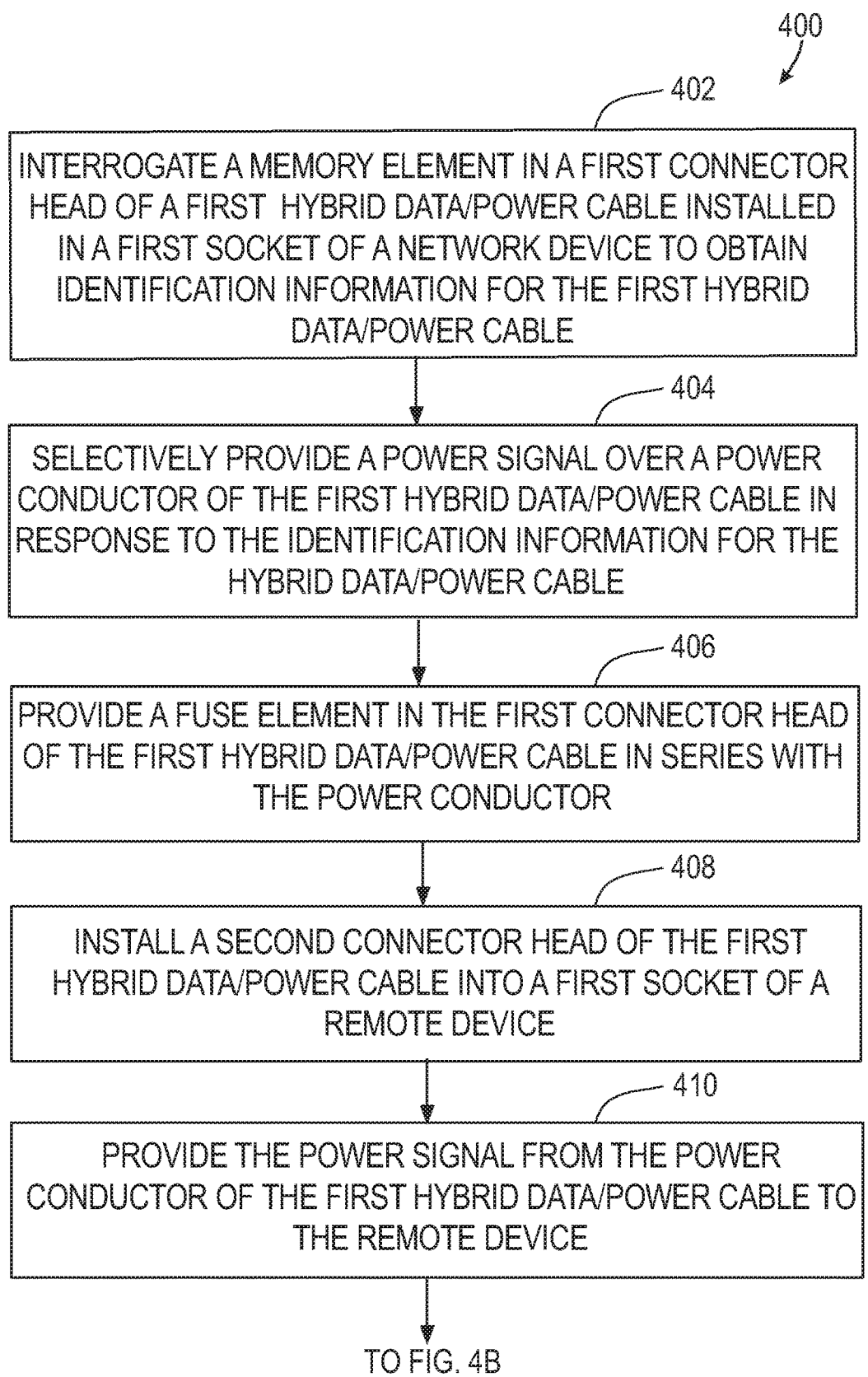
FIGS. 4A-4C are block diagrams of a method of operating a network system according to one example.
Figure 4B:
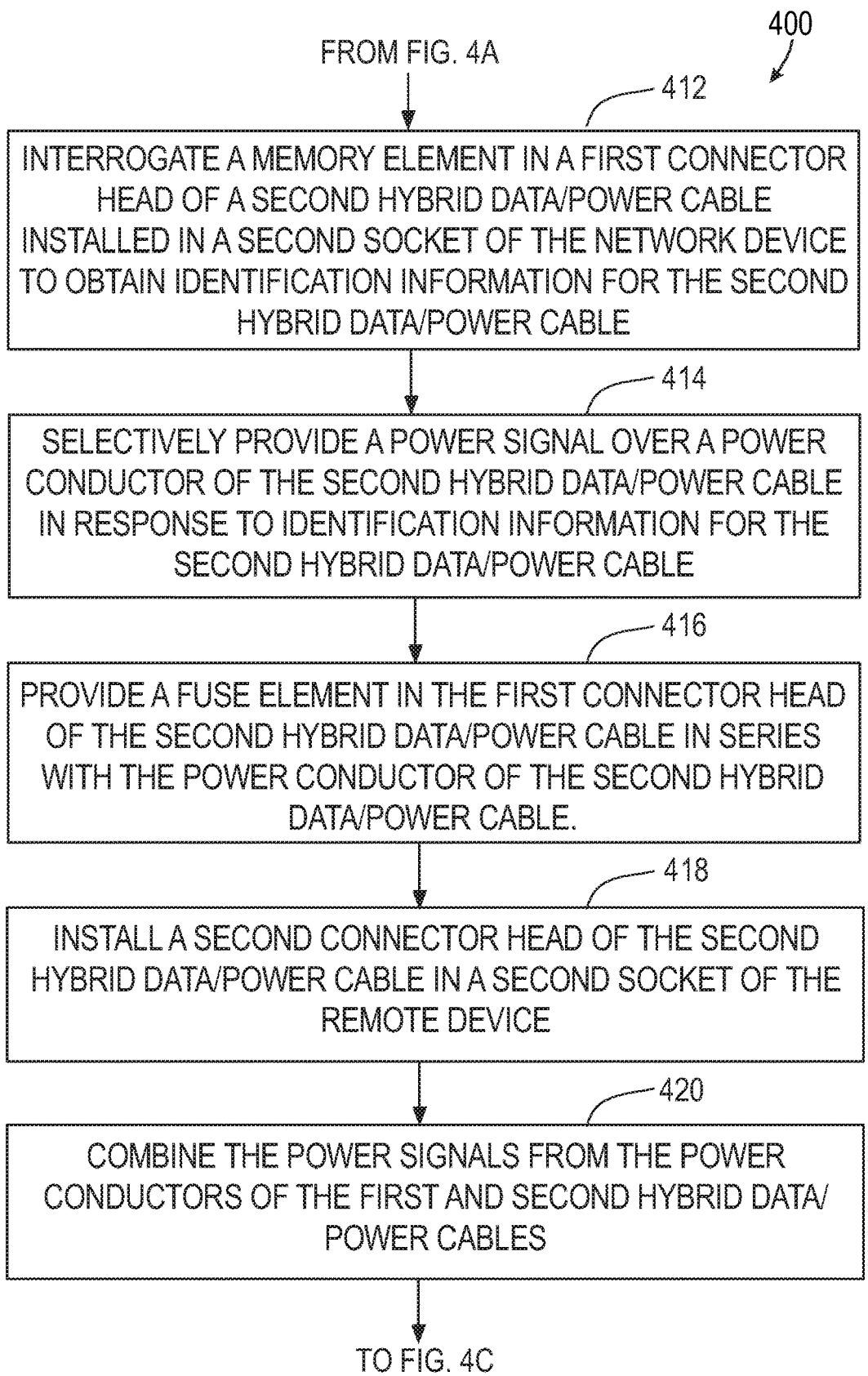
Figure 4C:
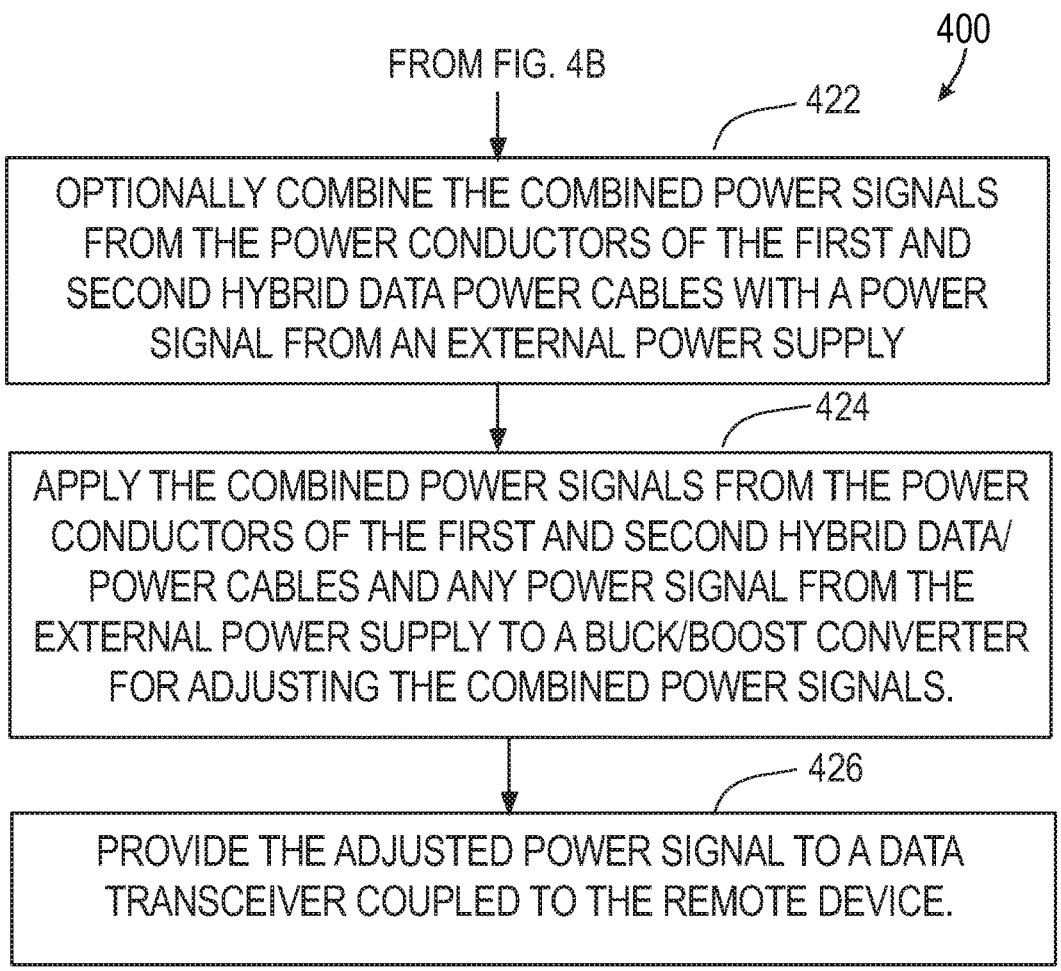

Referring to FIGS. 4A-4C, there is shown a flow diagram for a method 400 of operating a network system according to one or more examples. In this example, in block 402, a memory element of a first connector head of a first hybrid data/power cable installed in a first socket of a network device is interrogated to obtain identification information for the first hybrid data/power cable. Block 402 may be implemented in some examples by a CPU (such as CPU 246 in the example of FIGS. 2A and 2B) of a network device (such as network device 202 and first connector head 212 of first hybrid data/power cable 208 in the example of FIGS. 2A and 2B).

In block 404 of FIG. 4A, a power signal is selectively applied over a power conductor of the first hybrid data/power cable in response to the identification information obtained in block 402. Next, in block 406, a fuse element, such as fuse element 228 in the example of FIGS. 2A and 2B, in series with the power conductor of the hybrid data/power cable is provided in the first connector head of the first hybrid data/power cable.

In block 408 of FIG. 4A, a second connector head of the first hybrid data/power cable is installed in a first socket of a remote device. An example of this is shown in FIGS. 2A and 2B, where second connector head 214 of a first hybrid data/power cable 208 is installed in socket 216 of remote device 206.

In block 410 of FIG. 4A, a power signal on the power conductor of the first hybrid data/power cable is supplied to a remote device. In block 412 of FIG. 4B, a memory element in the first connector head of a second hybrid data/power cable is interrogated to obtain identification information for the second hybrid data/power cable, and in block 414 of FIG. 4B, a power signal is selectively applied to a power conductor in the second hybrid data/power cable. This is described above with reference to the example of FIGS. 2A and 2B.

In block 416 of FIG. 4B, a fuse element is provided in the first connector head of the second hybrid data/power cable, in series with the power conductor of the second hybrid data/power cable. Again, this is described with reference to the example of FIGS. 2A and 2B. In block 418 of FIG. 4B, a second connector head of the second hybrid data/power cable is installed in a second socket of the remote device, as is also described with reference to the example of FIGS. 2A and 2B.

In block 420 of FIG. 4B, the power signals on the respective power conductors of the first and second hybrid data/power cables are combined. An example of this is shown in FIGS. 2A and 2B, where the power conductors 224 of first and second hybrid data/power cables 208 are combined at output 238 of current-limiting circuit 232. In block 422 of FIG. 4C, the combined power signals from the power conductors of the first and second hybrid data/power cables may optionally be combined with a power signal from an external power supply. In the example of FIGS. 2A and 2B, an external power supply 236 is supplied to current-limiting circuit 232 and combined with the hybrid data/power cable power signals at the output 238 of current-limiting circuit 232.

In block 424 of FIG. 4C, the combined power signals from the power conductors of the first and second hybrid data/power cables, along with the optionally-supplied external power signal are provided to a buck/boost converter. This is shown in the example of FIGS. 2A and 2B, wherein the output 238 from current-limiting circuit 232 is applied to the input of buck/boost converter 240.

Finally, in block 426 of FIG. 4C, an adjusted power signal produced by the buck/boost converter is provided to a transceiver coupled to the remote device. In the example of FIGS. 2A and 2B, the output from the buck/boost converter is applied, through reverse current blocker 282, to transceivers 244 coupled to remote device 206.

Figure 5:
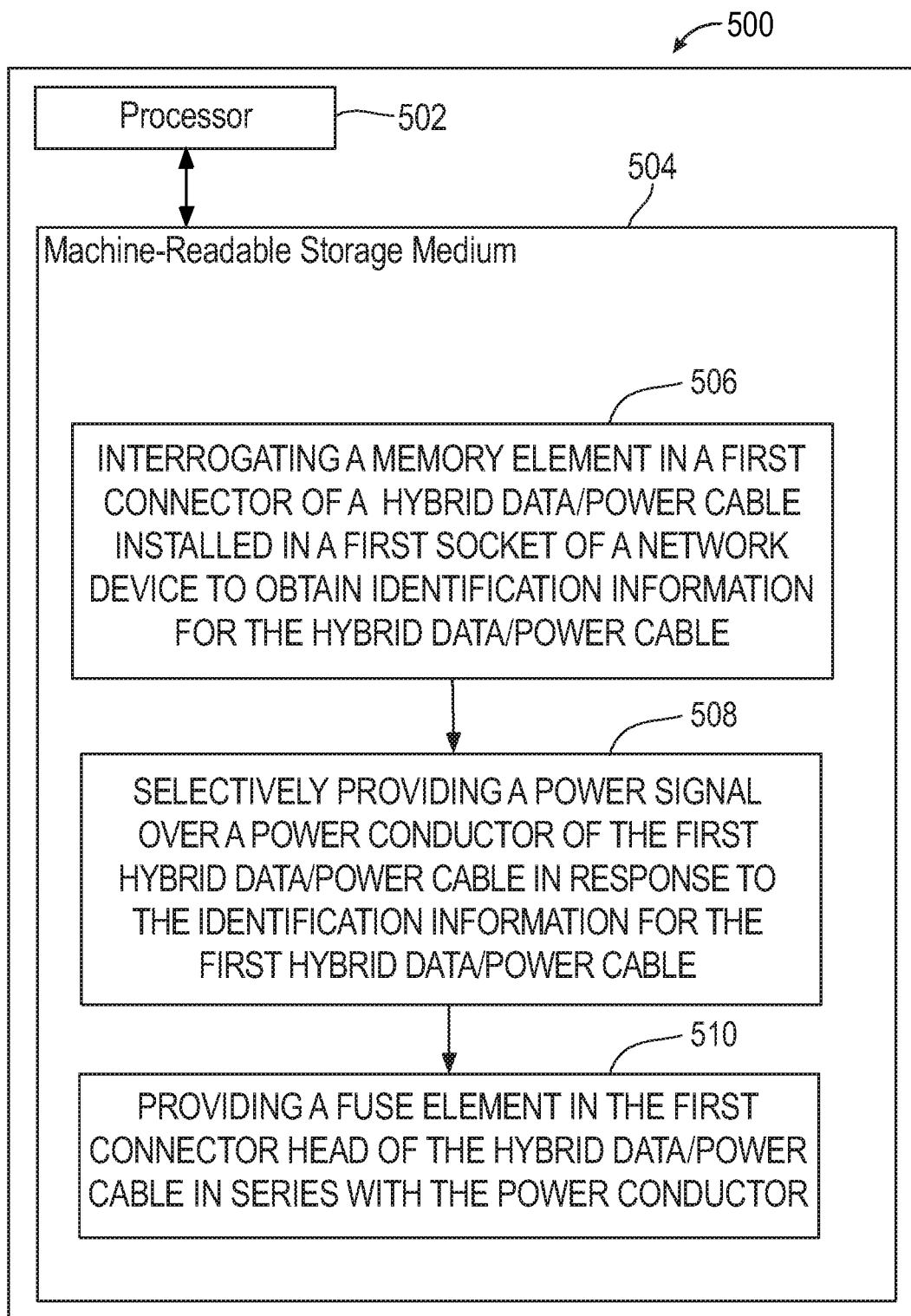
FIG. 5 is a block diagram of a network device implementing a method of operating a network system according to one example.

FIG. 5 is a block diagram of a network device 500 implementing a method of operation according to one or more disclosed examples. Network device 500 includes at least one processor 502 and a machine readable storage medium 504. As illustrated, machine readable storage medium 504 may store instructions, that when executed by processor 502 (either directly or via emulation/virtualization), cause hardware processor 502 to perform one or more disclosed methods in the system memory of a computing resource.

In the example of FIG. 5, machine-readable storage medium 504 contains instructions, in block 506, for causing processor 502 to interrogate a memory element in a first connector of a hybrid data/power cable installed in a first socket of a network device to obtain information for the first hybrid data/power cable. In the example of FIGS. 2A and 2B, CPU 246 in network device 202, operating based on instructions in memory 248, may interrogate memory element (EEPROM 254) of a first hybrid data/power cable 208 to obtain identification information for the first hybrid data/power cable 208.

Block 508 in the example of FIG. 5 represents stored instructions for selectively providing a power signal over a power conductor of the first hybrid data/power cable. Again, CPU 246 in the example of FIGS. 2A and 2B may cause a power signal to be selectively applied to the first hybrid data/power cable 208 in response to identification information from the first hybrid data/power cable 208 obtained by EEPROM 254.

Examples in the present disclosure may be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise random access memory (RAM), read-only memory (ROM), electrically-erasable/programmable read-only memory (EEPROM), compact disc ROM (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc ("CD"), laser disc, optical disc, digital versatile disc ("DVD"), floppy disk and Blu-ray® disc where disks usually reproduce data magnetically, while discs reproduce data optically with lasers.

Note also that the software implemented aspects of the subject matter hereof are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A network apparatus, comprising:
    a first hybrid data/power cable including a power conductor and a data conductor extending between a first end and a second end thereof, the first end of the first hybrid data/power cable terminated with a first connector head, the first connector head including a first fuse element coupled in series with the power conductor of the first hybrid data/power cable; and
    a remote device coupled to the second end of the first hybrid data/power cable for receiving a data signal from the data conductor of the first hybrid data/power cable and a DC voltage from the power conductor of the first hybrid data/power cable, the remote device including:
        a current-limiting circuit coupled in series with the power conductor of the first hybrid data/power cable to output a DC voltage; and
        a buck/boost converter coupled to the output of the current-limiting circuit for adjusting the DC voltage.

2. The network apparatus of claim 1, wherein:
    the buck/boost converter supplies the adjusted DC voltage to a socket of the remote device for receiving a modular transceiver.

3. The network apparatus of claim 1, wherein the remote device further includes an input to receive power from an external power supply to combine in the current-limiting circuit with the DC voltage from the power conductor of the first hybrid data/power cable.

4. The network apparatus of claim 1, wherein the first connector head further includes a memory element storing identification for the first hybrid data/power cable.

5. The network apparatus of claim 1, wherein the second end of the first hybrid data/power cable is terminated with a second connector head including a second fuse element in series with the power conductor.

6. The network apparatus of claim 5, wherein the second connector head includes a memory element storing identification for the hybrid data/power cable.

7. The network apparatus of claim 1, further comprising:
a second hybrid data/power cable including a power conductor and a data conductor extending between a first end and a second end thereof, the first end of the second hybrid data/power cable terminated with a first connector head, the first connector head of the second hybrid data/power cable including a fuse element coupled in series with the power conductor;
wherein the remote device is coupled to the second end of the second hybrid data/power cable to receive a power signal from the power conductor of the second hybrid data/power cable;
and wherein the current limiting device combines the power signal from the power conductor of the first hybrid data/power cable with the power signal from the power conductor of the second hybrid data/power cable to produce a combined power signal.

8. The network apparatus of claim 7, further comprising:
an electronic dispersion compensation circuit in series with the data conductor.

9. A system, comprising a network switch having a power source, coupled to the connector head at the first end of the hybrid data/power cable in the network apparatus of claim 3, the power switch selectively providing power to the power conductor of the hybrid data/power cable.

10. The system of claim 9, wherein the identification information is accessible by the network switch.

11. A method of operating a network device, comprising:
interrogating a memory element in a first connector head of a first hybrid data/power cable installed in a first socket of the network device to obtain identification information for the first hybrid data/power cable;
selectively providing a power signal over a power conductor of the first hybrid data/power cable in response to the identification information for the first hybrid data/power cable;
providing a fuse element in the first connector head of the first hybrid data/power cable in series with the power conductor;
interrogating a memory element in a first connector head of a second hybrid data/power cable installed in a second socket of the network device to obtain identification information for the second hybrid data/power cable;
selectively providing a power signal over a power conductor of the second hybrid data/power cable in response to the identification information for the second hybrid data/power cable; and
providing a fuse element in the second connector head of the second hybrid data/power cable in series with the power conductor of the second hybrid data/power cable.

12. The method of claim 11, further comprising:
installing a second connector head of the first hybrid data/power cable into a first socket of a remote device;
providing the power signal from the power conductor of the first hybrid data/power cable to the remote device.

13. The method of claim 12, further comprising:
providing a fuse element in the second connector head of the first hybrid data/power cable in series with the power conductor.

14. The method of claim 12, further comprising:
obtaining, from a second memory element in the second connector head, identification information for the first hybrid data/power cable.

15. The method of claim 11, further comprising:
installing a second connector head of the second hybrid data/power cable into a second socket of the remote device;
combining the power signal from the power conductor of the second hybrid data/power cable with the power signal from the power conductor of the first hybrid data/power cable to produce a combined power signal.

16. The method of claim 15, further comprising:
applying the combined power signal to a buck/boost converter for adjusting the combined power signal.

17. The method of claim 11, further comprising:
combining the power signal from the power conductor of the first hybrid data/power cable with a power signal from an external power supply.

18. The method of claim 12, further comprising:
providing the power signal from the power conductor of the first hybrid data/power cable to a data transceiver coupled to the remote device.

19. A non-transitory computer-readable medium tangibly embodying instructions executable by a hardware processor to:
interrogate a memory element of a first hybrid data/power cable coupled to a network device to obtain identification information for the first hybrid data/power cable; and
selectively provide a power signal on a power conductor of the first hybrid data/power cable in response to the identification information for the first hybrid data/power cable;
interrogate a memory element of a second hybrid data/power cable coupled to the network device to obtain identification information of the second hybrid data/power cable;
selectively provide a power signal on a power conductor of the second hybrid data/power cable in response to the identification information for the second hybrid data/power cable; and
combine the power signal from the power conductor of the second hybrid data/power cable with the power signal from the power conductor of the first hybrid data/power cable to produce a combined power signal.

* * * * *